(No Model.)

A. SHEA.
LEMON SQUEEZER.

No. 382,774. Patented May 15, 1888.

Witnesses:
Edgar A. Goddin.
Frederick L. Emery.

Inventor.
Albert Shea,
By Crosby & Gregory, Attys

UNITED STATES PATENT OFFICE.

ALBERT SHEA, OF BOSTON, MASSACHUSETTS, ASSIGNOR OF ONE-HALF TO FRANCIS A. SHEA, OF SAME PLACE.

LEMON-SQUEEZER.

SPECIFICATION forming part of Letters Patent No. 382,774, dated May 15, 1888.

Application filed March 16, 1888. Serial No. 267,304. (No model.)

*To all whom it may concern:*

Be it known that I, ALBERT SHEA, of Boston, county of Suffolk, State of Massachusetts, have invented an Improvement in Lemon-Squeezers, of which the following description, in connection with the accompanying drawings, is a specification, like letters on the drawings representing like parts.

This invention relates to an apparatus for expressing the juice from fruit, it being especially adapted to be used for squeezing lemons, and has for its object to provide an apparatus simple in construction and cheap, yet effective in operation.

My invention consists, essentially, in the combination, with a cup or receptacle having perforations in its bottom, of an upright or standard, a rack-bar, a toothed sector having a handle, a plunger or press connected to the said toothed sector, a knife, and a cover movable on said plunger or press, substantially as will be described.

Other features of my invention will be pointed out in the claims at the end of this specification.

Figure 1:
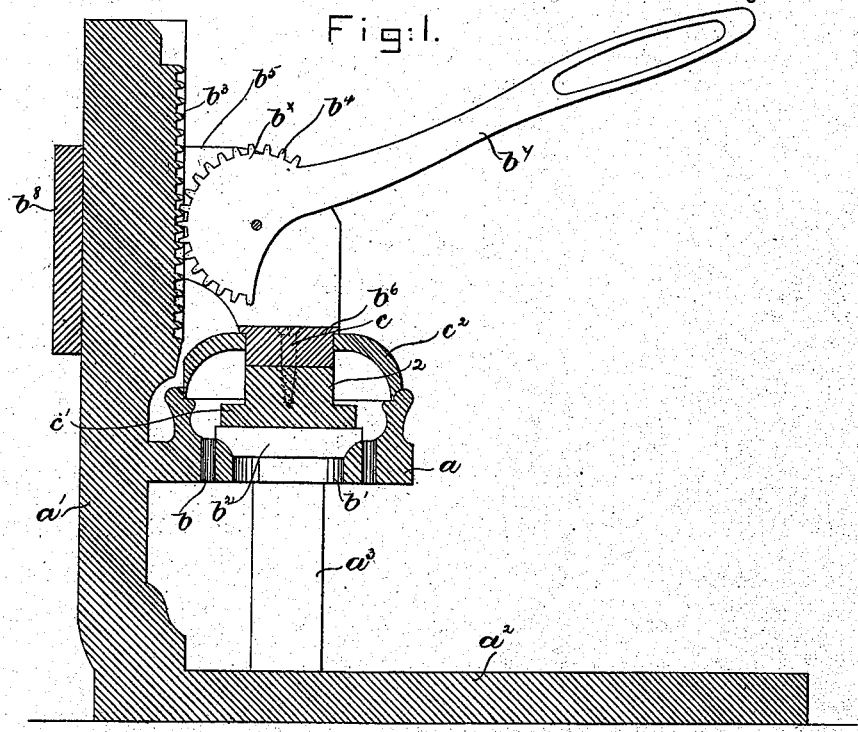
Figure 2:
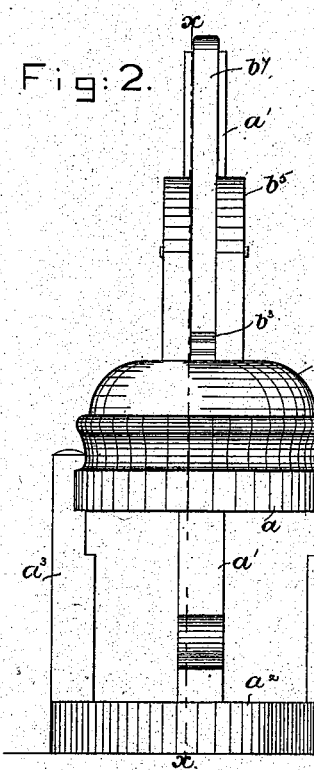
Figure 3:
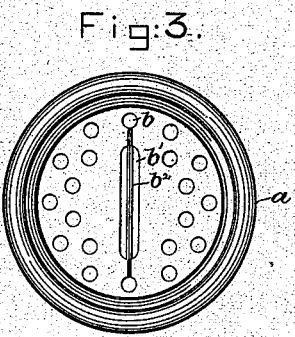

Figure 1 is a vertical section and elevation of a lemon squeezer embodying my invention, the section being taken on line $x$ $x$, Fig. 2; Fig. 2, an end elevation of the apparatus, looking toward the left in Fig. 1; and Fig. 3, a detail to be referred to.

The cup or receptacle $a$, to receive the lemon or other fruit from which the juice is to be expressed, is secured in suitable manner to an upright or standard, $a'$, supported upon a suitable base, $a^2$, the said cup or receptacle being further supported by uprights or standards $a^3$ on the said base.

The cup or receptacle $a$ is provided with perforations $b$ and a slot, $b'$, through the longitudinal center of which is extended, as shown, a knife, $b^2$, supported by the said cup or receptacle.

The upright or standard $a'$ is provided on one side or face with teeth $b^3$, forming a rack-bar, with which mesh the teeth $b^4$ of a sector, $b^x$, pivoted in arms $b^5$ of a plunger or press, $b^6$, the said toothed sector having an arm, $b^7$, to form a handle by which the plunger or press may be raised and lowered. The arms $b^5$ of the plunger or press extend beyond the upright or standard, and are joined or tied by a cross-bar, $b^8$, by which the toothed sector is maintained in mesh with the rack-bar.

The plunger or press is made in two parts, the lower part, 2, being secured to the upper part, as shown, by a screw, $c$, (see dotted lines, Fig. 1,) the said lower part, 2, having a flange, $c'$, by which a cover, $c^2$, on the plunger or press is raised when the plunger or press is elevated after performing its work.

In practice the lemon or other fruit is placed upon the knife and the handle or arm of the toothed sector depressed to bring the plunger or press down upon the lemon, thus cutting the said lemon in two and expressing the juices therefrom.

The juices expressed from the lemon or other fruit will be collected in a suitable vessel, not shown, but which in practice is placed below the cup or receptacle $a$.

I claim—

1. The combination, with a cup or receptacle having perforations in its bottom, of an upright or standard, a rack-bar, a toothed sector having a handle, a plunger or press connected to the said toothed sector, a knife, and a cover movable on said plunger or press, substantially as described.

2. The combination, with a cup or receptacle having perforations $b$ and slot $b'$ in its bottom, of a knife, $b^2$, an upright or standard, $a'$, a rack-bar, $b^3$, a plunger or press having arms $b^5$, extended beyond the said standard, a cross-bar joining said arms, a cover on said plunger or press, and a toothed sector pivoted in said arms and provided with a handle, substantially as described.

In testimony whereof I have signed my name to this specification in the presence of two subscribing witnesses.

ALBERT SHEA.

Witnesses:
   JAS. H. CHURCHILL,
   J. C. SEARS.